(12) United States Patent
Rostedt (10) Patent No.: US 8,495,642 B2
(45) Date of Patent: Jul. 23, 2013

(54) MECHANISM FOR PRIORITY INHERITANCE FOR READ/WRITE LOCKS

(75) Inventor: Steven D. Rostedt, Endwell, NY (US)

(73) Assignee: Red Hat, Inc., Raleigh, NC (US)

( * ) Notice: Subject to any disclaimer, the term of this patent is extended or adjusted under 35 U.S.C. 154(b) by 1088 days.

(21) Appl. No.: 12/150,090

(22) Filed: Apr. 23, 2008

(65) Prior Publication Data
US 2009/0271793 A1    Oct. 29, 2009

(51) Int. Cl.
*G06F 9/46*    (2006.01)
(52) U.S. Cl.
USPC ............................................................ 718/103
(58) Field of Classification Search
None
See application file for complete search history.

(56) References Cited

U.S. PATENT DOCUMENTS

| | | | | |
|---|---|---|---|---|
| 7,334,229 B1 * | 2/2008 | McDonald et al. | ............ | 718/104 |
| 2005/0060710 A1 * | 3/2005 | Kush | ............... | 718/103 |
| 2006/0184942 A1 | 8/2006 | Cox | | |
| 2006/0248127 A1 | 11/2006 | Whitehouse | | |
| 2006/0282836 A1 * | 12/2006 | Barker | ............ | 718/103 |
| 2007/0067774 A1 * | 3/2007 | Kukanov et al. | ............ | 718/102 |
| 2008/0040720 A1 * | 2/2008 | McKenney et al. | ............ | 718/103 |

OTHER PUBLICATIONS

Kawash, Jalal. "Process Synchronization with Readers and Writers Revisited" Journal of Computing and Information Technology—CIT 13, 2005, 1, pp. 43-51.*

* cited by examiner

*Primary Examiner* — Jacob A Petranek
(74) *Attorney, Agent, or Firm* — Lowenstein Sandler LLP (57) ABSTRACT

In one embodiment, a mechanism for priority inheritance for read/write locks (RW locks) is disclosed. In one embodiment, a method includes setting a maximum number of read/write locks (RW locks) allowed to be held for read by one or more tasks, maintaining an array in each of the one or more tasks to track the RW locks held for read, linking a RW lock with the array of each of the tasks that own the RW lock, and boosting a priority of each of the tasks that own the RW lock according to a priority inheritance algorithm implemented by the RW lock.

20 Claims, 8 Drawing Sheets

MECHANISM FOR PRIORITY INHERITANCE FOR READ/WRITE LOCKS

TECHNICAL FIELD

The embodiments of the invention relate generally to real-time computing and, more specifically, relate to priority inheritance for read/write locks (RW locks).

BACKGROUND

A lock is a synchronization mechanism used to enforce limits on access to a given resource, such as a file, memory location, I/O port, and the like, usually to ensure that only one thread of execution uses the resource at a time. Read/write locks (RW locks) are locks that allow for multiple readers to hold the lock at the same time, while only one writer at a time may hold the lock. A writer looking to obtain a RW lock must block until all readers or another writer have released the lock and, conversely, all readers seeking a RW lock must wait for a writer to release the lock to acquire it.

One problem with RW locks is the phenomenon known as unbounded priority inversion. One example of unbounded priority inversion is where there are three processes with three different priorities. These processes are known as A, B and C, where A is of highest priority and C is lowest. C takes a lock 'L' and is preempted by A due to priority. A then tries to take lock L but cannot because C has it. As a result, A blocks on the lock and lets C run again. But, at this point, B comes in and preempts C from running due to priority. If B is not also trying to own the lock C holds, B can keep C, and thereby A, from running for as long as it wants. The unbounded priority inversion results from B keeping A from running even though A is of higher priority than B.

Priority Inheritance (PI) is a way to prevent unbounded priority inversion. Priority inheritance provides a solution so that when a process with high priority blocks on a lock held by a process with lower priority, the owner of the lock "inherits" the priority of the process that is blocking. When the lock is released the owner loses that priority. In the above example, when A blocked on process C, C would inherit the priority of process A. Then, when B came along, B would be preempted by C's new inherited higher priority. In this way, B can no longer unwittingly preempt A. When C releases the lock, it would lose the priority of A and go back to its original priority. A would then run again, and B would have to wait for A to finish.

However, PI is a very complex solution to implement. It is complex when only dealing with locks that have a single owner. Yet, RW locks may have several owners. For example, imagine processes A, B, C, D, E, and F, where A is the highest priority, and F is the lowest. A tries to take a RW lock for write, but C, D, E and F all have it for read. If B preempts just one of C, D, E, or F and it is not seeking the lock, then B can keep the RW lock from being released for A. On a multiprocessor system, this can happen quite often. When a lock has multiple owners (such as with RW locks) the PI algorithm becomes much more complex. There have been various solutions utilized to try to overcome this difficulty.

One solution is not to implement PI on RW locks at all. This is a simple solution, but allows for the above priority inversion problem to take place. Another solution is to serialize the readers in a RW lock. This means that the lock will only allow for one reader at a time, which converts the RW lock into a simple mutual exclusion algorithm (mutex). If two readers try to take the lock, the second reader will block and have to wait for the first reader to release the lock. The problem with this solution is a loss of performance that RW locks with multiple readers provide for parallel computing.

A third solution implements large-scale locking via dynamically-allocated arrays. This solution tries to link PI and multiple reader RW locks together by allocating memory when creating new locks. When more readers need to grab the lock, more memory is allocated to store the data. However, this solution cannot be utilized inside the kernel; it can only be implemented in user space. This is because the memory management of the kernel itself uses RW locks, so no memory allocation is allowed. This solution is also slow and may be no better than the solution of serializing the readers in a RW lock.

A final solution is to limit the number of readers per RW lock. With this solution, each RW lock is given an array associated with readers that can take the lock; this array tracks the max reader limit. When more readers than the limit try to take the lock for read, they block. The problem with this solution is that it is possible to exceed the number of readers allowed. Another problem is that the kernel has thousands of locks and by making an array for each lock, it takes up a lot of memory (as the kernel has thousands of locks, and increasing each lock by X readers is huge).

A system that provides a priority inheritance solution for RW locks without requiring any special memory allocations and without limiting the number of readers that can grab the lock would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for priority inheritance of read/write locks (RW locks). In one embodiment, a method of priority inheritance for RW locks includes setting a maximum number of read/write locks (RW locks) allowed to be held for read by one or more tasks, maintaining an array in each of the one or more tasks to track the RW locks held for read, linking a RW lock with the array of each of the tasks that own the RW lock, and boosting a priority of each of the tasks that own the RW lock according to a priority inheritance algorithm implemented by the RW lock.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
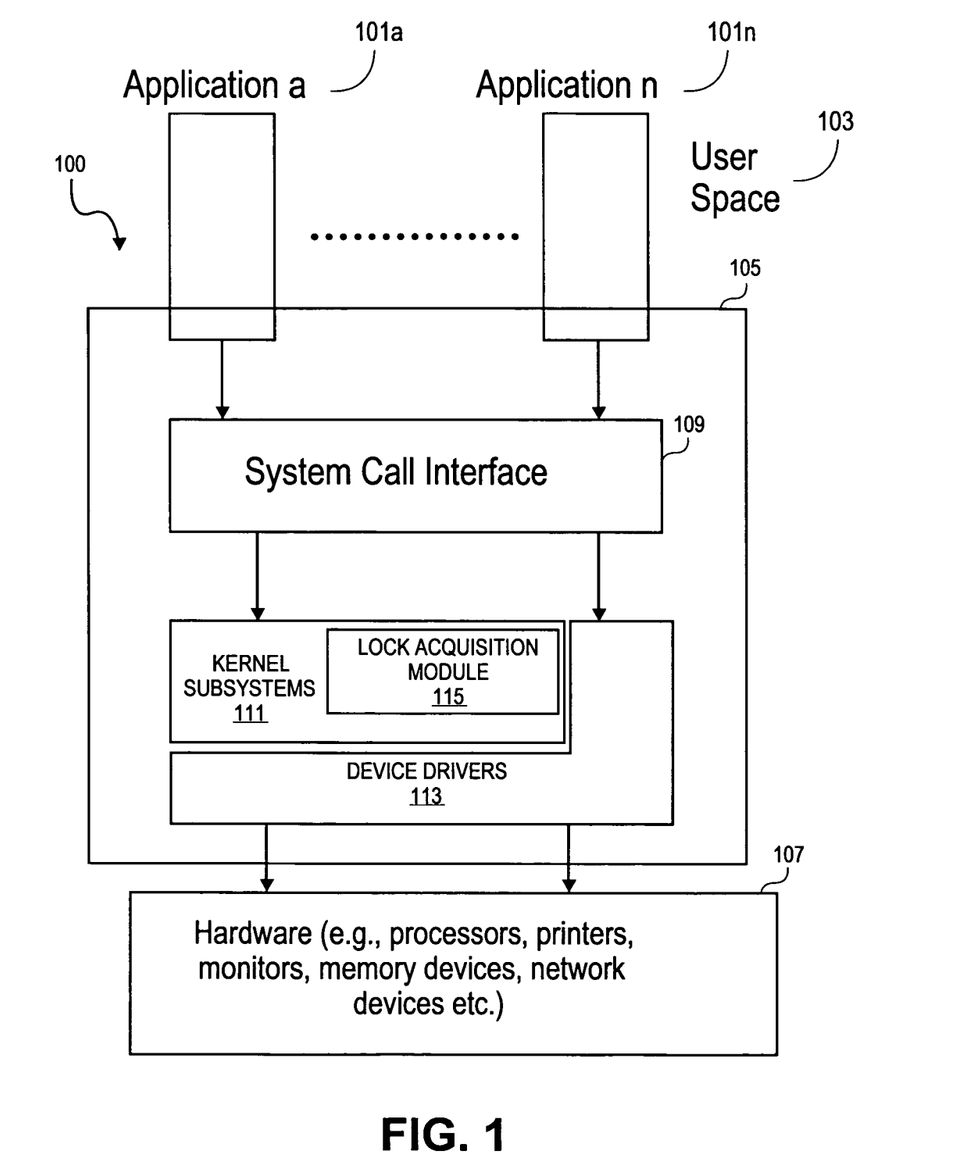
FIG. 1 is a block diagram of an exemplary operating system user space and kernel space in which embodiments of the invention may be implemented.

FIG. 1 is a block diagram of a computer system in which embodiments of the invention may be implemented. In particular, FIG. 1 shows the relationship between applications 101$a$-$n$, kernel 105, and hardware 107. Application programs 101$a$-$n$ can include, for example, conventional word processing, graphic, and/or web browser programs, which directly interact with an end user. Application programs 101$a$-$n$ are executed in a user space 103, and can be referred to as "processes," or "tasks" when program instructions are executed by the central processing unit (CPU) or multiple CPUs (not shown).

Kernel 105 includes system call interface 109, kernel subsystems 111, and device drivers 113. Application programs 101$a$-$n$ communicate with kernel by making a conventional system call. System call interface 109 can receive requests from processes to access hardware 107 such as printers, monitors, storage devices, and/or network devices. Kernel 105 can execute these requests via kernel subsystems 111 and device drivers 113 in a conventional manner. Kernel subsystems 111 can also include interrupt handlers to service interrupt requests, a memory management system to manage address spaces, and system services such as networking and interprocess communications (IPC).

When performing, for example, conventional asynchronous input-output (I/O) between application programs 101$a$-$n$ and kernel 105, application programs 101$a$-$n$ invoke a system call to kernel 105 to initiate each I/O. For example, application program 101$a$-$n$ typically calls a function in a library, such as a C library, that in turn relies on system call interface 109 to instruct kernel 105 to conduct one or more tasks on its behalf. When a system call takes place, an application program 101$a$-$n$ that makes the call is suspended, and the kernel 105 takes over.

Techniques for acquiring a lock can be done in user space 103 where, for example, an application program 101$a$-$n$ acquires a lock, or by the kernel 105, where the kernel 105 acquires the lock. As used herein, a lock is used to deny access to a given resource, such as a file, memory location, I/O port, and the like, usually to ensure that only one application program 101$a$-$n$, and/or process associated therewith, at a time uses the resource. As discussed previously, one type of lock is a read/write lock (RW lock) that provides for shared ownership of the lock by multiple readers, while only one writer at a time can own the lock.

Embodiments of the present invention focus on acquisition of RW locks by kernel 105. These RW locks are used to protect internal data in the kernel and are not for use in the user space. As such, kernel 105 may include a lock acquisition module 115 in kernel subsystems 111 that operates to perform priority inheritance (PI) for RW locks in computer system 100 according to embodiments of the invention.

Embodiments of the invention provide a solution for implementing PI for RW locks in a way that does not limit the number of readers for a RW lock, as well as does not need any special memory allocations to obtain the RW lock. One embodiment of the invention provides an algorithm that enhances an existing PI algorithm that can be found in the LINUX kernel (i.e., kernel/rtmutex.c). The existing PI algorithm serializes RW locks so that only one reader may acquire the RW lock at a time.

The algorithm of embodiments of the invention extends the existing PI algorithm by adding a new encapsulating descriptor over the existing PI algorithm's mutex descriptor. In embodiments of the invention, the new encapsulating descriptor for RW locks may be called the rw_mutex. The rw_mutex contains an internal mutex to help with the PI chain. The internal mutex is only allowed to have a single owner at a time. When the rw_mutex has a single owner, such as for writes, the internal mutex may have a pointer to that particular owner. On the other hand, when the rw_mutex has multiple owners, the internal mutex owner is set to a factitious owner. For the purpose of the following description, the factitious owner may be called MULTI_OWNER.

In embodiments of the invention, in order to keep track of priorities and PI chains, the rw_mutex keeps track of all the owners that own it. In addition, each owner of a RW lock keeps track of all the locks that it owns. Furthermore, each owner also maintains a priority sorted link list of all PI waiters that are blocked for each lock that the owner owns. This priority-sorted linked list only includes the highest priority tasks that are blocked on each lock owned by the owner.

Figure 2:
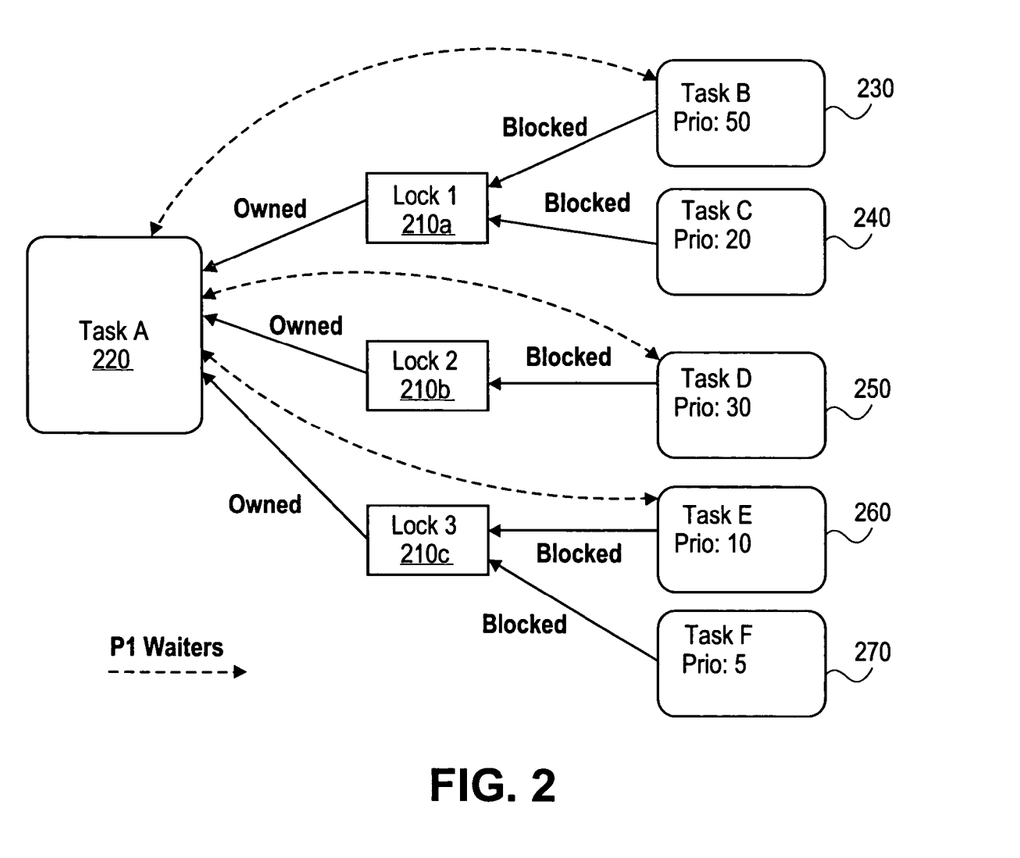
FIG. 2 is a block diagram illustrating the relationships that are accounted for with embodiments of the invention.

FIG. 2 is a block diagram illustrating the relationships that are accounted for with embodiments of the invention. Each lock 201*a-c* keeps track of their owner, here Task A 220. The tasks 230, 240, 250, 260, 270 that are blocked on a lock 210*a-c* keep track of the lock 210*a-c* they are blocked on. Note that a task may only be blocked on a single lock at a time. Tasks, such as Task A 220, do not keep track of the locks that they own. However, a task 220 does keep track of the PI waiters 230-270 (tasks blocked on locks that they own) for each lock in a priority-ordered linked list. This priority-ordered linked list only tracks the highest priority task that is blocked on each lock that a task owns. For example, in FIG. 2, the tasks that are in the priority-ordered link list of Task A 220 are Tasks B 230, D 250, and E 260.

Under the principles of PI, when a high priority task blocks on a lock, the priority of the owner of the lock is boosted to the higher priority if it is lower than the blocked task. This process requires walking the PI chain (lock to owner to lock if owner is blocked, etc). If the owner is also blocked on a lock, the owner of that lock may also have its priority boosted if it is lower than the original blocked task. At each stage of the chain, embodiments of the invention enable the current owner of a RW lock to determine its priority by looking at the priority-sorted linked list of all the PI waiters that it has. The highest priority task in the PI waiters list has its priority compared to the task's priority. The task's priority is boosted if its priority is lower than the highest priority task in the priority-sorted linked list of PI waiters.

Figure 3:
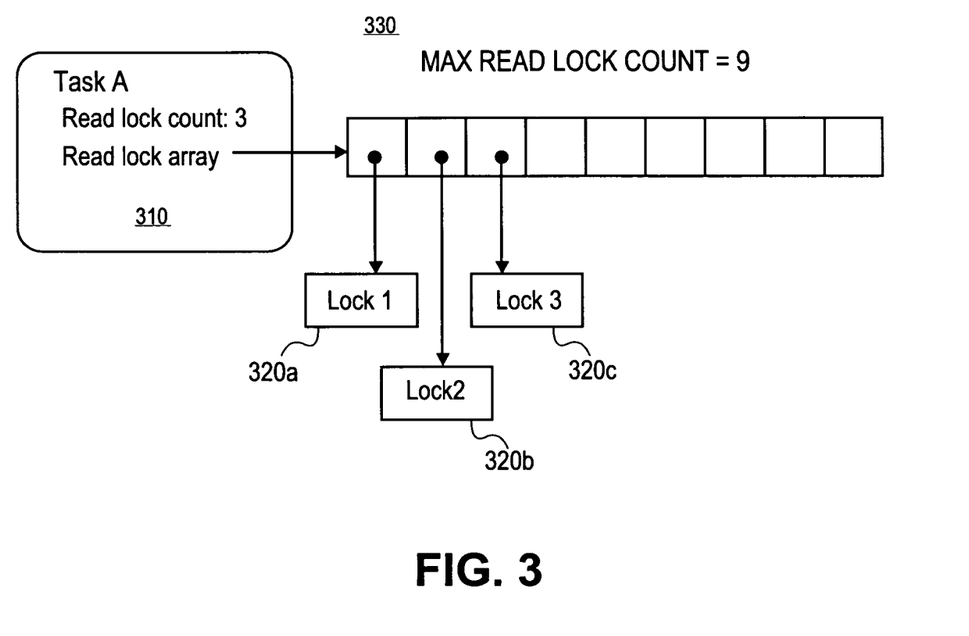
FIG. 3 is a block diagram illustrating a relationship between a task and one or more RW locks according to an embodiment of the invention.

As discussed previously, RW locks allow for multiple owners because the lock may be owned by multiple readers. Embodiments of the invention allow for each task descriptor to keep track of the RW locks that it holds for reading. To eliminate any run time memory allocations, embodiments of the invention limit the number of RW locks per task, which in turn allows the task descriptor to maintain a finite array that tracks the task's RW locks held for read. Limiting the number of RW locks held for reading at a single time per task should not be an issue as the number of different locks that a task may hold at any given time is determined by the design of a program when it is created. That number is fixed and does not change later on. For example, FIG. 3 is a block diagram illustrating a task 310 that holds three RW locks 320*a-c* for read, where the maximum number of read locks 330 held at a single time may be nine.

In addition, as an unlimited number of readers may cause unknown latencies for writers to acquire the lock, some embodiments of the invention allow for limiting the number of readers that may acquire the RW lock at run time. This limit may be added, modified or removed by the user at practically any time.

Figure 4:
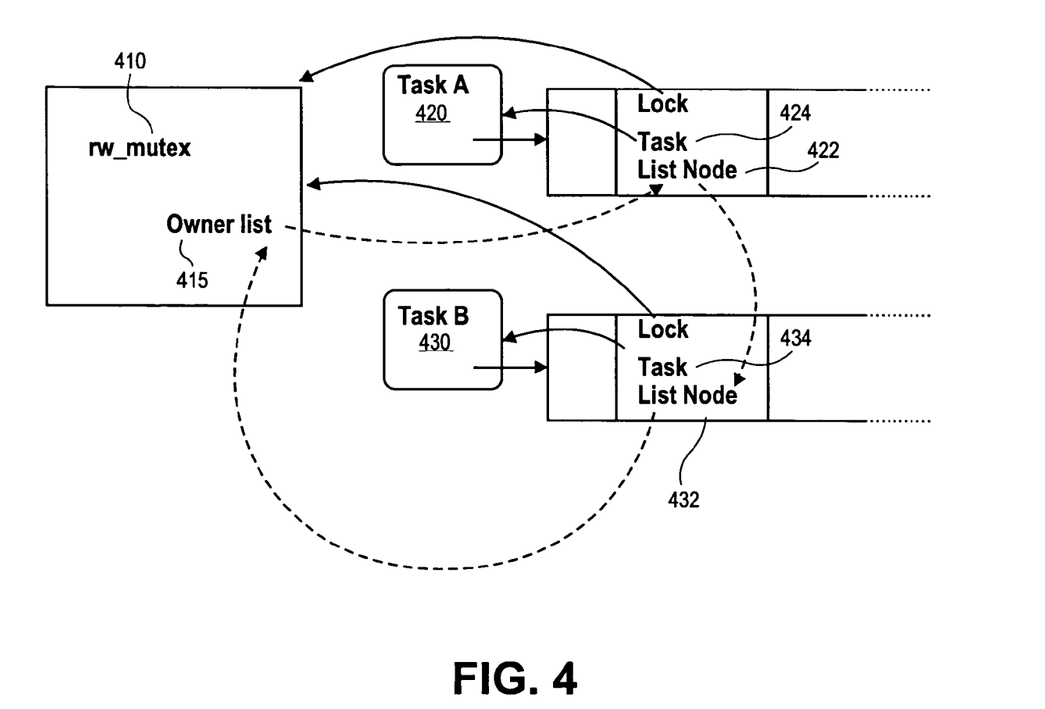
FIG. 4 is a block diagram that illustrates the relationships between the rw_mutex and tasks according to an embodiment of the invention.

As a RW lock may have multiple owners and each task may have multiple locks for read, embodiments of the invention also provide for keeping pointers that link owners and tasks without having to dynamically allocating them. FIG. 4 is a block diagram that illustrates the relationships between the rw_mutex and tasks according to an embodiment of the invention. As shown in FIG. 4, the rw_mutex 410 holds a head pointer 415 of a linked list of all of the readers 420, 430 that hold the rw_mutex 410. This linked list of all the readers is created by including with each entry in a Task_Read_Lock_Array of each task a link node 422, 432 that links together the other owners of that lock as well as a pointer 424, 434 to the lock 410.

An important component of embodiments of the invention is the management taking place between RW locks and the tasks. To enable this management, each task includes a counter of the number of RW locks that it holds for reads. Each task also includes an array of descriptors that point to the possible RW locks that the task may hold for reading. Each descriptor within the array may be called the TASK READ LOCK descriptor. In some embodiments, the TASK READ LOCK descriptor has the following elements: (1) a pointer back to the task itself; (2) a pointer to the rw_mutex; (3) a list node to link to other read owners; and (4) a counter of the number of times that the task has acquired this same lock.

In addition, embodiments of the invention also utilize an rw_mutex descriptor to help enable management between RW locks and tasks. In some embodiments, the rw_mutex descriptor contains the following fields: (1) owner—a pointer to the memory address of the owner task; (2) mutex—the mutex descriptor that may only contain a single owner; (3) count—the number of times the lock has been acquired for read; (4) owners—the number of readers that own the lock; and (5) readers—a link list of all the readers that own this lock (links to the list node of the TASK_READ_LOCK).

According to embodiments of the invention, the states that an rw_mutex may be in are as follows:

1. Unowned—The RW lock is not owned by any task.
2. Owned by single reader—The RW lock has a single reader that owns the lock.
3. Owned by single reader with waiters—the RW lock is owned by a single reader but there exist tasks that are also blocked on the lock and are waiting. PI boosting may or may not occur depending on the relationship between the priorities of the owner of the lock and the waiters.
4. Owned by multiple readers—The RW lock has more than one reader and no waiters.
5. Owned by multiple readers with waiters—The RW lock has more than one reader and there are tasks blocked on the lock.
6. Owned by single writer—The RW lock is owned by a single writer.
7. Owned by a single writer with waiters—The RW lock is owned for write and there are tasks that are blocked on the lock.

8. Unowned with Pending Reader—The RW lock has recently been released and given ownership to a blocked reader and no other waiters exist. The reader does not claim ownership of the lock until it is scheduled to run and successfully acquires the lock. Another higher priority writer may still come by and steal the lock before it can be acquired.
9. Unowned with Pending Reader with other readers and no writers and not over reader limit—The RW lock was recently released and there is more than one reader waiting on the lock. The number of waiting readers is under the max reader limit or no max reader limit exists. The highest priority reader is given the Pending status to the lock and all the other readers that are waiting to acquire the lock are awoken.
10. Unowned with Pending Reader with writer waiter next or read lock limit reached—The RW lock has recently been released and given ownership to the highest priority task waiting which happens to be a task wanting the lock for read. The next highest priority task (or from FIFO order if the priorities were the same) is a task waiting to grab the lock for write or the reader limit has been reached and the next task could be for read. The initial reader is woken up but still does not have the lock.
11. Unowned with Pending Writer—The RW lock has recently been released and the only task waiting for the lock is for write.
12. Unowned with Pending Writer and other waiters—The RW lock has recently been released and the next highest priority task to acquire the lock is for write but there also exists other tasks that are blocked on the lock (for read or write).

The state transitions for above are:
1: 2, 6
2: 1, 3, 6
3: 5, 11, 12 (8, 9, 10 if reader limit exists)
4: 2, 5
5: 3
6: 1, 7
7: 8, 9, 10, 11, 12
8: 2, 6, 10
9: 2, 6, 10
10: 3, 7
11: 2, 6, 12
12: 3, 7

As detailed above, states 8, 9, 10, 11, and 12 all deal with pending owners. Pending ownership/lock stealing may be utilized to pass ownership to a task that is waiting for a lock. When a RW lock is released that has blocked tasks waiting for that lock, instead of giving full ownership to the task, it is given pending ownership. This is to allow for the case where a higher priority task comes along and wants to acquire the lock before the pending owner wakes up and actually takes the lock. For example, if a new task comes along and tries to acquire the lock before the pending owner wakes up, a compare is done between the priorities of the two tasks. If the pending owner is of higher priority than or equal to the new task, the new task will then block on the lock. If the new task is of higher priority than the pending owner, the new task will steal the lock from the pending owner. A pending owner that has its lock stolen goes back to a state of running and not blocked, but does not have the lock. When the task finally does get scheduled in, it will try to acquire the lock again.

Embodiments of the invention utilize internal locks within the PI mutex which the rw_mutex encapsulates. As such, RW locks that implement PI also need protection of their internal operations, which these internal locks can provide. In embodiments of the invention, not only does the mutex have its own internal lock, but all tasks also have an internal lock. The internal lock of the mutex protects changes to the PI waiters of the mutex (i.e., tasks blocked on the mutex). The internal lock of each task protects both changes to the task priority and changes to the priority-sorted linked list of PI waiters for the task.

Figure 5:
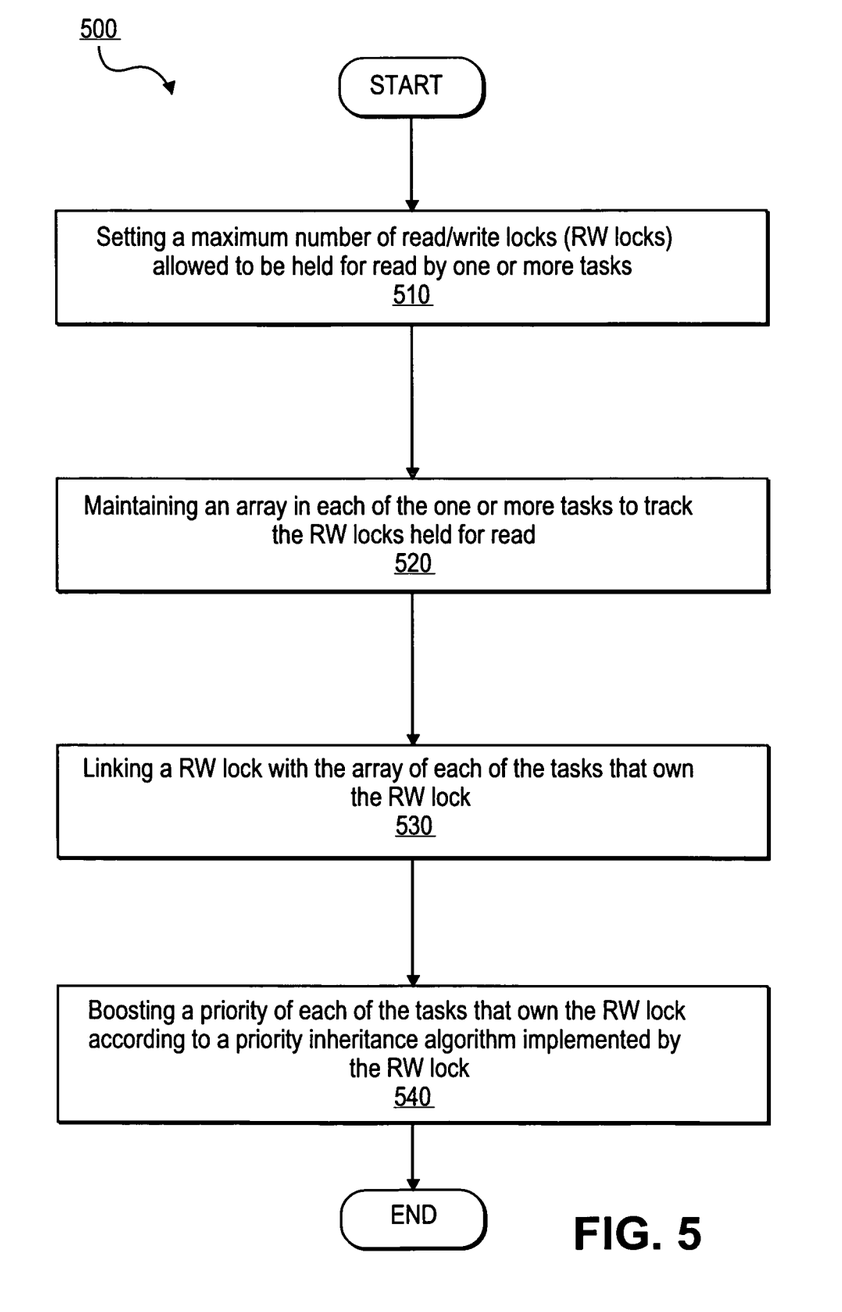
FIG. 5 is a flow diagram illustrating a method for acquisition of a RW lock for read according to an embodiment of the invention.

FIG. 5 is a flow diagram illustrating a method 500 for acquisition of a RW lock for read according to an embodiment of the invention. Method 500 may be performed by processing logic that may comprise hardware (e.g., circuitry, dedicated logic, programmable logic, microcode, etc.), software (such as instructions run on a processing device), or a combination thereof. In one embodiment, method 500 is performed by the lock acquisition module 115 of FIG. 1.

Method 500 provides a high-level method for utilizing RW locks with PI according to embodiment of the invention. Method 500 begins at block 510 where a maximum number of RW locks allowed to be held for read by one or more tasks is set in the kernel. Then, at block 520, an array in each of the one or more tasks is maintained to track the RW locks held for read. At block 530, a RW lock is linked with the array of each of the tasks that own the RW lock. Finally, at block 540, a priority of each of tasks that own the RW lock is boosted according to a PI algorithm implemented by the RW lock. Further details of the implementation of method 500 are described below.

Embodiments of the invention implement atomic compare and exchange for a RW lock if that lock is not owned and does not have any pending owners (e.g., transitions between states 1 and 2, or states 1 and 6). Atomic compare and exchange is implemented to acquire ownership of both the rw_mutex and the internal mutex (within the rw_mutex). The atomic compare and exchange process avoids the operation of acquiring the internal mutex lock, and may also be known as the "fast path" in some embodiments. With atomic compare and exchange, the address of the owner of the RW lock is passed into the owner field of the rw_mutex and is set only if the owner field is currently NULL (zero). If it is not NULL, then a "slow path" is taken (which acquires the internal mutex lock), which is described in detail further below.

Embodiments of the invention may implement either the fast path or the slow path to acquire RW locks. When the embodiments of the invention implement atomic compare and exchange and all task descriptors are aligned in memory, then the fast path code may be implemented. The fast path enables the RW lock to be acquired by a single reader or writer when there is no contention, without needing to take the internal rw_mutex lock. Because the list of readers in the rw_mutex descriptor is protected solely by the internal mutex lock, the link list will not updated when the first reader acquires the RW lock by the fast path. Therefore, if a subsequent reader follows or a writer blocks, embodiments of the invention dictate that the subsequent reader or blocked writer take the internal lock and update the RW lock owner's linked list.

When using the slow path, the RW lock is marked by setting the zero bit (least significant bit) of the owner field of the rw_mutex. Such marking of the RW lock prevents other processes from taking the fast path. In the fast path, the owner field should equal the memory location of the owning task's descriptor. By setting the least significant bit, the comparison of the owner field will fail and force the owner to take the slow path to release the RW lock.

Figure 6:
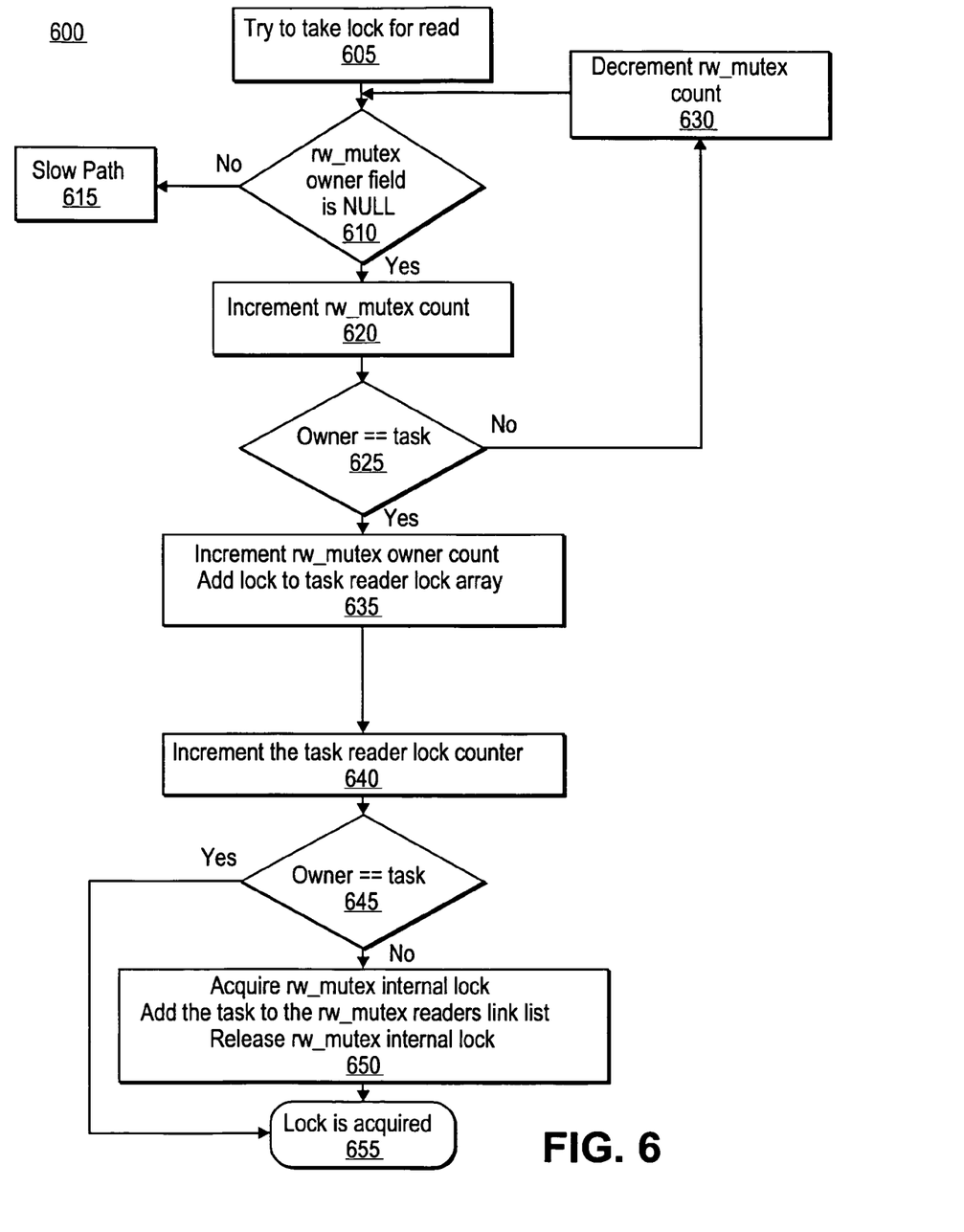
FIG. 6 is a flow diagram illustrating a method for acquisition of a RW lock for read via a fast path according to an embodiment of the invention.

FIG. 6 is a flow diagram illustrating a method 600 for acquisition of a RW lock for read via a fast path according to an embodiment of the invention. Method 600 may be performed by processing logic that may comprise hardware (e.g., circuitry, dedicated logic, programmable logic, microcode, etc.), software (such as instructions run on a processing device), or a combination thereof. In one embodiment, method 600 is performed by the lock acquisition module 115 of FIG. 1.

Blocks 605 and 610 test for whether the fast path may be taken to acquire a RW lock as described above. If the fast path cannot be taken (e.g., the rw_mutex owner field is not NULL), then the slow path is taken at block 615. After the lock has been acquired by atomic compare and exchange, more must be done to handle any races with the slow path as no internal mutex lock has been taken. After incrementing the counter at block 620, the owner field must still equal the task descriptor at block 625. If it does not, this means that another reader could have acquired and release the lock and reset the owner field (since the count has not be set yet). The count is decremented at block 630, and the ownership of the lock is tried again.

After adding the lock to the owner task TASK_READ_LOCK descriptor at block 635, the owner tasks reader count is incremented at block 640. Contention on the lock at this moment may try to update the owner's TASK_READ_LOCK list node, but as the lock has not been added to the owner's field, the contenting task will fail in this task. A check for contention with the lock is made again at block 645. The owner field of the rw_mutex will only be equal to the single owner when there is no contention and it hasn't been marked. If the owner field of the rw_mutex is no longer equal to the task descriptor at block 645, then the mutex internal lock is acquired and the TASK_READ_LOCK list node is updated manually if needed at block 650. If there is no contention at block 645, then the RW lock is acquired at block 655.

The internal mutex of the rw_mutex is used when a task may block on the lock. This mutex should have its owner set. But, as the fast path of method 600 skips setting this field, the next blocking task of the RW lock should update the internal mutex. To address this problem, the fast path (for both read and write) copies a pointer to the owner into the rw_mutex owner field. For read owners, the internal mutex owner is set to MULTI_OWNER. For write owners, the owner themselves is copied to the internal mutex owner field.

Figure 7:
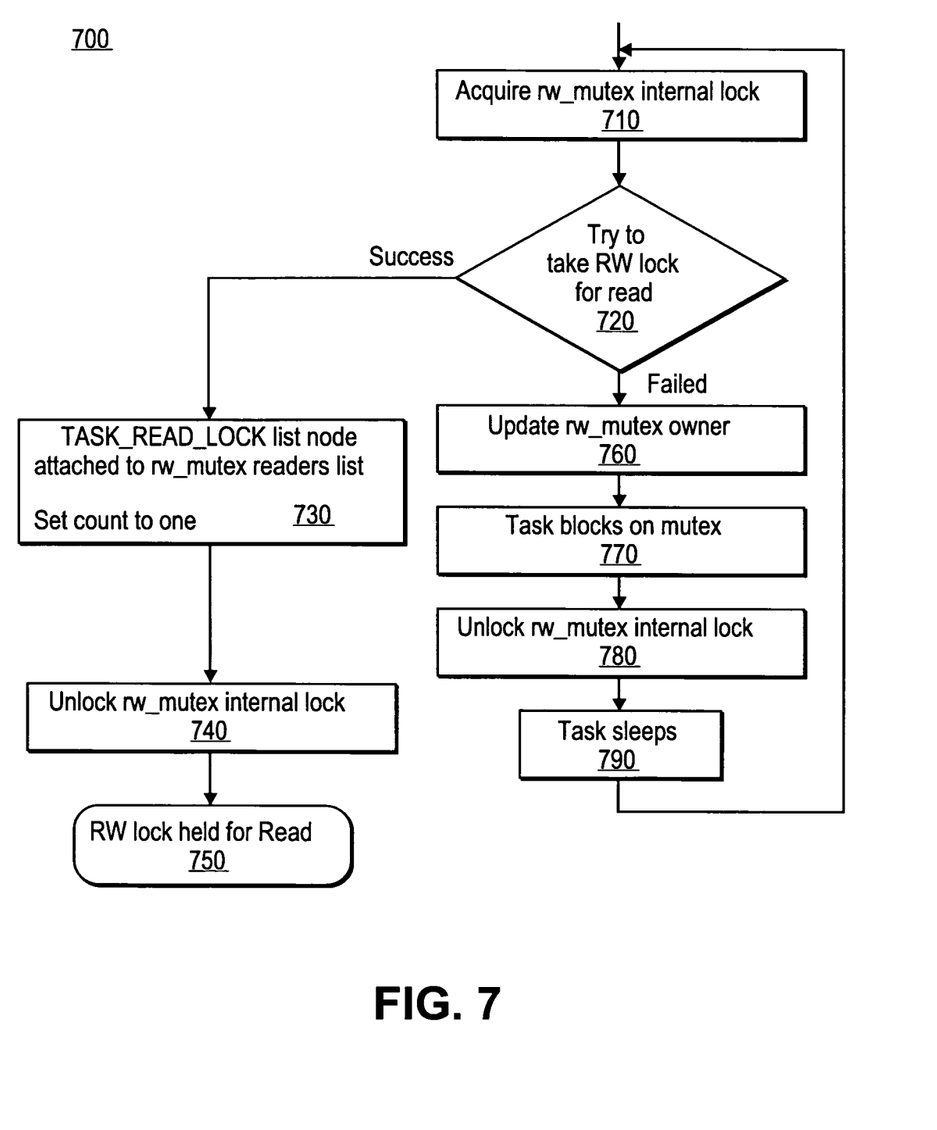
FIG. 7 is a flow diagram illustrating one embodiment of a method for acquiring a RW lock for read via a slow path according to an embodiment of the invention.

Embodiments of the invention also utilize a slow path to acquire the RW lock. FIG. 7 is a flow diagram illustrating one embodiment of a method 700 for acquiring a RW lock for read via a slow path according to an embodiment of the invention. Method 700 may be performed by processing logic that may comprise hardware (e.g., circuitry, dedicated logic, programmable logic, microcode, etc.), software (such as instructions run on a processing device), or a combination thereof. In one embodiment, method 700 is performed by the lock acquisition module 115 of FIG. 1.

In block 710, the mutex's internal lock is taken to guarantee synchronized access within all other simultaneously running slow paths. In block 720, an attempt to take an RW lock for read is made. The details underlying the attempt for the RW lock in block 720 are complex and further explanation of the process of this block is detailed below. Initially, the rw_mutex owner is marked to force all new acquires or releasing of the lock into the slow path, and thus serialized by the rw_mutex internal lock. Then, it is determined if the RW lock is already owned by another task. If the RW lock is already owned by another task and that owner is a writer, then the operation of trying to take the RW lock for read at block 720 fails. In another embodiment, if a reader limit exists and the maximum number of readers already owns the lock, then a failed result is returned at block 720.

If the RW lock is already owned by the present acquiring task for read, the count in the TASK_READ_LOCK descriptor of the task is incremented and the rw_mutex is set to the factitious owner MULTI_OWNERS. In one embodiment, the lock may have been taken originally via the fast path, so the TASK_READ_LOCK list node may need to be updated and attached to the rw_mutex readers list. Subsequently, a success result is returned at block 720.

It is also possible that the previous owner of the RW lock released the lock between the time the fast path failed, and the task entered the new slow path. If the lock is now free, the acquiring task may take it with the factitious owner MULTI_OWNER, and return a success result at block 720. Utilizing the MULTI_OWNER flag even when there is only a single owner helps prevent possible race conditions.

In another embodiment, if the rw_mutex is not presently owned by MULTI_OWNER (e.g., a pending owner is present), the task may try to steal the RW lock. For instance, if a pending owner is of lower priority than the acquiring task, then it will steal the lock. If the steal fails, and the owner is a pending writer, then a failed result is returned at block 720. Otherwise, it is checked whether the acquiring task has a higher priority than all of the other tasks blocked on the lock. If there are no tasks blocked on the lock or the acquiring task is of higher priority than any of the waiters, the rw_mutex owner is set to MULTI_OWNER and a success result is returned at block 720.

Returning to the remaining blocks of process 700, if the result of block 720 is successful, then the TASK_READ_LOCK list node of the acquiring task is attached to the rw_mutex readers list and the count set to one at block 730. If the TASK_READ_LOCK list node has already been attached to the list and this is a reacquiring of the RW lock for read, then the node does not need to be attached and the count (for the number of times the RW lock has been taken) is incremented by one. Then, at block 740 the rw_mutex internal lock is released and the RW lock is held for read at block 750.

In one embodiment, if the failed result is returned, then the rw_mutex had another owner such as described above. The method 700 continues by updating the rw_mutex owner at block 760. For instance, the owner is set to MULTI_OWNER when the internal mutex is acquired by a reader, as the internal mutex should not be owned by a reader (described previously above). In some cases, the internal mutex may point to a pending owner that will acquire the lock for read, but when the lock is taken that mutex owner is set to the factitious MULTI_OWNER.

At block 770, the task blocks on the rw_mutex when it cannot acquire the RW lock for read. When a task blocks on a lock and it is of higher priority than the owner of the lock, then the owner of the lock will get its priority boosted by the PI algorithm. Under PI, priorities are boosted up the chain of lock ownership. The process of block 770 encompasses the handling of priority chain boosting in the PI algorithm for RW locks. The internal mutex lock is already acquired when entering block 770, and the blocking task is added to the wait list of the internal mutex. If the priority of the task is now the highest priority task waiting on the mutex, it removes the previously highest waiter (if one exists) from the lock owner's PI list. If the owner of the mutex is the factitious MULTI_OWNER, then the priority boosting algorithm takes another path for handling locks owned by multiple readers, described further below. Otherwise, all internal locks are released and the chain is walked.

In order to walk the chain, the lock owner's PI internal lock is acquired again, and the lock owner's priority is boosted if the highest priority task on the owner's PI list is higher than the owner's current priority. In some embodiments, the lock owner may have released the lock already and the blocking task is no longer on the owner's PI list. As such the lock owner's priority is not boosted, which is acceptable as the owner should only have its priority boosted by tasks on its PI list.

In one embodiment, if the lock owner is blocked on another lock, which other lock's internal lock is taken with a "trylock." A trylock takes the other lock's internal lock if it is free, but will return a failure if it cannot acquire the internal lock. A trylock does not block. This is done because the typical locking order of internal locks takes the mutex's internal lock first and then the lock owner's PI internal lock. However, with trylocks, the opposite order is taken (first the task's PI internal lock, then the mutex's internal lock). To prevent deadlocking, a trylock is used. If the trylock fails, then the lock owner's PI lock is released and reacquired, and then the trylock is performed again if the owner is still blocked on the other lock.

In one embodiment, if the owner of the other lock is MULTI_OWNER, then the PI chain walk breaks and calls the code explained in handling locks owned by multiple readers described below. If the owner of the first lock is the new highest priority process that is blocked on the other lock, then the previous highest priority waiter from the other lock owner's PI list is removed and the owner is added to the other lock's owner PI list. Then, the first lock owner's PI internal lock is released and the new other lock owner's PI internal lock is acquired. Subsequently, the mutex internal lock is released and the above process is repeated until the entire chain is walked. When the priority boosting is completed, the rw_mutex internal lock is released at block 780 and the tasks sleeps at block 790 until it is awoken to try to take the RW lock for read at a later time.

In some embodiments, code is needed to handle locks owned by multiple readers. When a mutex is encountered that has the MULTI_OWNER field set for its owner, then the PI chain walk exits and calls a recursive function that iterates over each of the owners of a read lock. This function is called with the internal mutex lock being held, and that lock is not released until all the read owners have walked the PI chain. A loop is taken that calls the PI list walk explained above with each reader in turn being called as the initial owner of the lock. After all of the readers have been run through the PI algorithm boosting, then the internal mutex lock is released.

In one embodiment, taking a lock for write in the fast or slow path is less complex than taking a read (as described above) in either path. For the fast path, the atomic compare and exchange is performed on the rw_mutex owner, inserting the owner and setting the second least significant bit (this bit informs the algorithm that the lock is owned for write). If it succeeds, the lock is owned by the writer; otherwise the writer falls into the slow path.

The slow path for write is the same as detailed FIG. 7 (except that it attempts to take a RW lock for write, instead of read, at block 720). The attempt to take a RW lock for write is less complex than its read counterpart attempt. It marks the rw_mutex owner to force others into the slow path. If the owner is a reader, it updates the reader's TASK_READ_LOCK list node if necessary. If the lock has been released and has no owner or pending owner, the lock is taken by the task for write. If the lock is pending, it tries to steal the lock. If stealing the lock fails, then the function fails. On a successful result, it updates the rw_mutex owner with the pointer to itself and sets the second least significant bit to acknowledge that the lock is owned as a writer.

Figure 8:
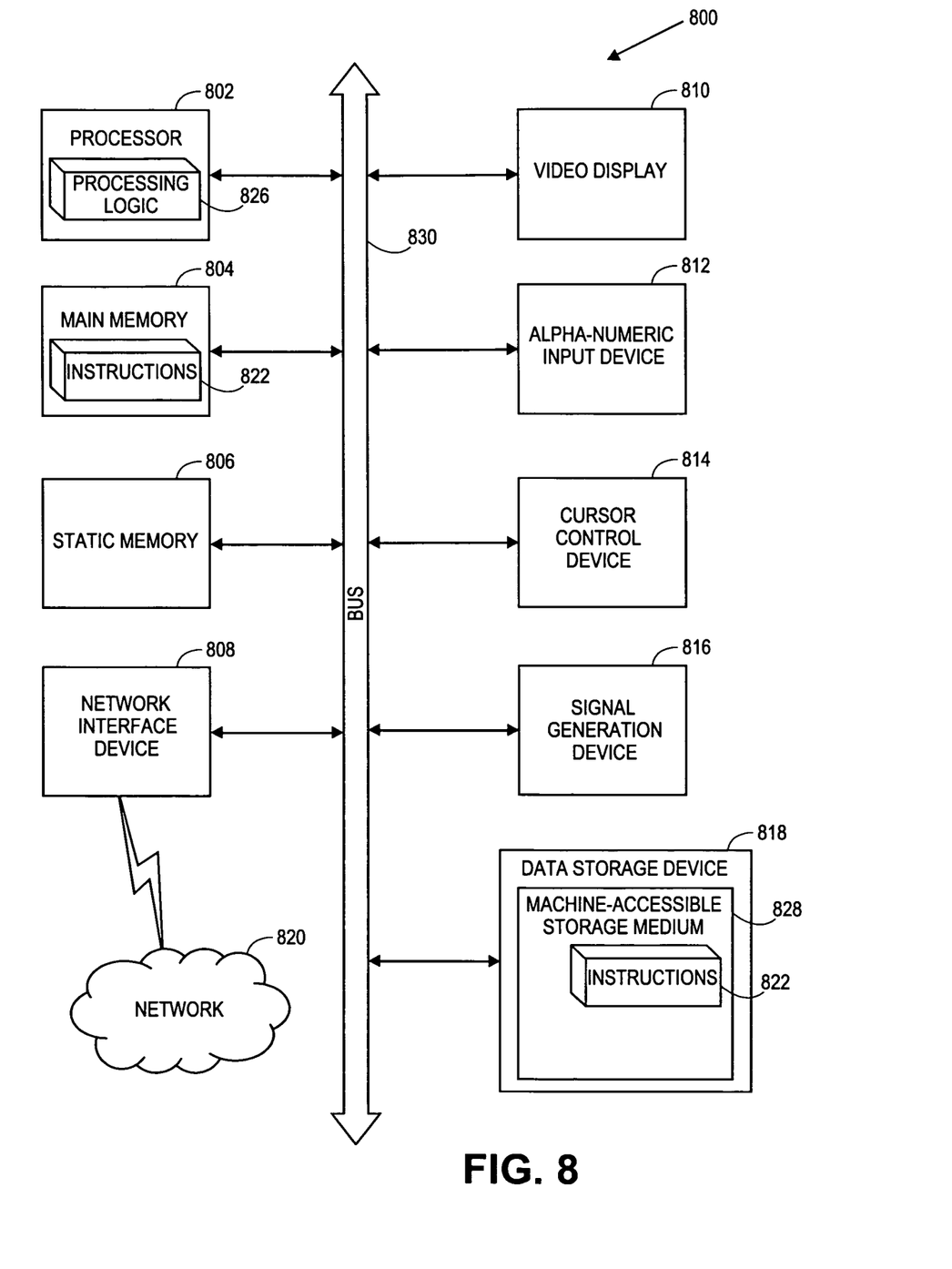
FIG. 8 illustrates a block diagram of one embodiment of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828 on which is stored one or more set of instructions (e.g., software 822) embodying any one or more of the methodologies of functions described herein. The software 822 may also reside, completely or at least partially, within the main memory 804 and/or within the processing device 802 during execution thereof by the computer system 800; the main memory 804 and the processing device 802 also constituting machine-accessible storage media. The software 822 may further be transmitted or received over a network 820 via the network interface device 808. In one embodiment, the network interface device 808 may be operable to receive messages from the broadcaster or the recipient as described above in various embodiments of the invention.

The machine-readable storage medium 828 may also be used to store a lock acquisition module (e.g., lock acquisition module 115 of FIG. 1), and/or a software library containing methods that call the above applications. While the machine-accessible storage medium 828 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
setting, by a kernel of a computing device, a maximum number of read/write (RW) locks allowed to be held for read by tasks executing on the computing device;
maintaining, by the kernel, an array in each of the tasks, the array of each task to track identification of the RW locks held for read by the task associated with the array, wherein the array of each task comprises an array descriptor associated with each RW lock held for read by the task;
determining, by the kernel, that one or more of the tasks own a RW lock, wherein each RW lock comprises a RW lock descriptor to manage a relationship between the RW lock and each of the determined one or more tasks that own the RW lock;
linking, by the kernel, the RW lock with the array of each of the determined one or more tasks that own the RW lock; and
boosting, by the kernel, a priority of each of the determined one or more tasks that own the RW lock according to a priority inheritance algorithm implemented by the RW lock.

2. The method of claim 1, wherein the array descriptor comprises a pointer back to the task, a pointer to an associated RW lock, a list node to link to other read owners of the associated RW lock, and a counter to track the number of times that the task has acquired the associated RW lock.

3. The method of claim 1, wherein the RW lock descriptor comprising a pointer to the memory address of an owner task, a mutex descriptor, a count to track a number of times the RW lock has been acquired for read, a number of reader tasks that own the RW lock, and a link list of all the reader tasks that own the RW lock.

4. The method of claim 3, wherein the link list of the RW lock links to a list node of the RW lock descriptor associated with the RW lock in an array of one of the tasks that own the RW lock.

5. The method of claim 1, wherein one of the tasks utilizes a fast path to acquire the RW lock for read, the fast path comprising an atomic compare and exchange algorithm that acquires the RW lock by passing an address of the task into an owner field of the RW lock only if the owner field of the RW lock is currently null, wherein the fast path avoids acquiring an internal mutex lock of the RW lock.

6. The method of claim 1, wherein one of the tasks utilizes a slow path to acquire the RW lock for read when an owner field of the RW lock is not equal to null, the slow path acquiring an internal mutex lock of the RW lock to guarantee synchronized access with all other simultaneously running slow paths.

7. The method of claim 1, wherein the RW lock comprises an internal mutex to assist the priority inheritance algorithm, the internal mutex having an owner that is set to a factitious owner when more than one task owns the RW lock for read.

8. The method of claim 1, further comprising limiting the number of tasks that can acquire the RW lock for read at run time.

9. A system, comprising:
a processing device;
device drivers communicably coupled to the processing device, the device drivers to control hardware components of the system;
a system call interface to receive requests from one or more tasks to access the hardware components; and
a kernel executable by the processing device, the kernel to communicably couple the system call interface and the device drivers, the kernel comprising a lock acquisition module to:
set a maximum number of read/write (RW) locks allowed to be held for read by tasks executing on the system;
maintain an array in each of the tasks, the array of each task to track identification of the RW locks held for read by the task associated with the array, wherein the array of each task comprises an array descriptor associated with each RW lock held for read by the task;
determine that one or more of the tasks own a RW lock, wherein each RW lock comprises a RW lock descriptor to manage a relationship between the RW lock and each of the determined one or more tasks that own the RW lock;
link the RW lock with the array of each of the determined one or more tasks that own the RW lock; and
boost a priority of each of the determined one or more tasks that own the RW lock according to a priority inheritance algorithm implemented by the RW lock.

10. The system of claim 9, wherein the array descriptor comprises a pointer back to the task, a pointer to an associated RW lock, a list node to link to other read owners of the associated RW lock, and a counter to track the number of times that the task has acquired the associated RW lock.

11. The system of claim 9, wherein the RW lock descriptor comprising a pointer to the memory address of an owner task, a mutex descriptor, a count to track a number of times the RW lock has been acquired for read, a number of reader tasks that own the RW lock, and a link list of all the reader tasks that own the RW lock.

12. The system of claim 11, wherein the link list of the RW lock links to a list node of the RW lock descriptor associated with the RW lock in an array of one of the tasks that own the RW lock.

13. The system of claim 9, wherein one of the tasks utilizes a fast path to acquire the RW lock for read, the fast path comprising an atomic compare and exchange algorithm that acquires the RW lock by passing an address of the task into an owner field of the RW lock only if the owner field of the RW lock is currently null, wherein the fast path avoids acquiring an internal mutex lock of the RW lock.

14. The system of claim 9, wherein one of the tasks utilizes a slow path to acquire the RW lock for read when an owner field of the RW lock is not equal to null, the slow path acquiring an internal mutex lock of the RW lock to guarantee synchronized access with all other simultaneously running slow paths.

15. The system of claim 9, wherein the RW lock comprises an internal mutex to assist the priority inheritance algorithm, the internal mutex having an owner that is set to a factitious owner when more than one task owns the RW lock for read.

16. A non-transitory machine-readable storage medium including data that, when accessed by a processing device, cause the processing device to perform operations comprising:
- setting, by a kernel executable by the processing device, a maximum number of read/write (RW) locks allowed to be held for read by tasks executing on the computing device;
- maintaining, by the kernel, an array in each of the tasks, the array of each task to track identification of the RW locks held for read by the task associated with the array, wherein the array of each task comprises an array descriptor associated with each RW lock held for read by the task;
- determining, by the kernel, that one or more of the tasks own a RW lock, wherein each RW lock comprises a RW lock descriptor to manage a relationship between the RW lock and each of the determined one or more tasks that own the RW lock;
- linking, by the kernel, the RW lock with the array of each of the determined one or more tasks that own the RW lock; and
- boosting, by the kernel, a priority of each of the determined one or more tasks that own the RW lock according to a priority inheritance algorithm implemented by the RW lock.

17. The non-transitory machine-readable storage medium of claim 16, wherein the array descriptor comprises a pointer back to the task, a pointer to an associated RW lock, a list node to link to other read owners of the associated RW lock, and a counter to track the number of times that the task has acquired the associated RW lock.

18. The non-transitory machine-readable storage medium of claim 16, wherein each RW lock comprises a RW lock descriptor to manage a relationship between the RW lock and each of the determined one or more tasks that own the RW lock, the RW lock descriptor comprising a pointer to the memory address of an owner task, a mutex descriptor, a count to track a number of times the RW lock has been acquired for read, a number of reader tasks that own the RW lock, and a link list of all the reader tasks that own the RW lock.

19. The non-transitory machine-readable storage medium of claim 16, wherein one of the tasks utilizes a fast path to acquire the RW lock for read, the fast path comprising an atomic compare and exchange algorithm that acquires the RW lock by passing an address of the task into an owner field of the RW lock only if the owner field of the RW lock is currently null, wherein the fast path avoids acquiring an internal mutex lock of the RW lock.

20. The non-transitory machine-readable storage medium of claim 16, wherein one of the tasks utilizes a slow path to acquire the RW lock for read when an owner field of the RW lock is not equal to null, the slow path acquiring an internal mutex lock of the RW lock to guarantee synchronized access with all other simultaneously running slow paths.

* * * * *